(12) United States Patent
Aggarwal et al.

(10) Patent No.: US 9,297,705 B2
(45) Date of Patent: Mar. 29, 2016

(54) SMART TEMPERATURE MEASURING DEVICE

(75) Inventors: Ravinder K. Aggarwal, Gilbert, AZ (US); Rand Conner, Chandler, AZ (US)

(73) Assignee: ASM America, Inc., Phoenix, AZ (US)

( * ) Notice: Subject to any disclaimer, the term of this patent is extended or adjusted under 35 U.S.C. 154(b) by 594 days.

(21) Appl. No.: 12/436,306

(22) Filed: May 6, 2009

(65) Prior Publication Data

US 2010/0286842 A1 Nov. 11, 2010

(51) Int. Cl.
- *G01K 1/14* (2006.01)
- *G01K 7/02* (2006.01)
- *G01K 1/02* (2006.01)
- *G05D 23/19* (2006.01)
- *G05D 23/22* (2006.01)

(52) U.S. Cl.
CPC .. *G01K 7/02* (2013.01); *G01K 1/02* (2013.01); *G05D 23/1931* (2013.01); *G05D 23/22* (2013.01)

(58) Field of Classification Search
CPC .......... G01K 15/00; G01K 11/00; G01K 7/02
USPC ......... 374/179, 208, 170, 141, 1, 100, 57, 31, 374/163; 136/200; 340/870.17; 702/130, 99
See application file for complete search history.

(56) References Cited

U.S. PATENT DOCUMENTS

| | | |
|---|---|---|
| 154,695 A | 9/1874 | Manly |
| 2,059,480 A | 11/1936 | Obermaier |
| 2,266,416 A | 12/1941 | Duclos |
| 2,563,931 A | 8/1951 | Harrison |
| 2,660,061 A | 11/1953 | Lewis |
| 3,011,006 A | 11/1961 | Nicholson |
| 3,038,951 A | 6/1962 | Mead |
| 3,263,502 A | 8/1966 | Springfield |

(Continued)

FOREIGN PATENT DOCUMENTS

| | | |
|---|---|---|
| CN | 2101223 | 4/1992 |
| CN | 1815155 | 8/2006 |

(Continued)

OTHER PUBLICATIONS

International Search Report and Written Opinion for Application No. PCT/US2010/033252 dated Jan. 28, 2011.

(Continued)

*Primary Examiner* — Gail Kaplan Verbitsky
(74) *Attorney, Agent, or Firm* — Snell & Wilmer LLP

(57) ABSTRACT

A temperature measuring device having a smart chip, or electronic circuit, integrated therein is provided. The smart chip, or electronic circuit, includes at least a unique identification number or data specific to the particular temperature measuring device stored thereon. The electronic circuit further includes calibration data of the temperature measuring device stored thereon. A module controller of a temperature control system is configured to verify the unique identification number of the thermocouple assembly prior to allowing data to be transferred between the temperature measuring device and a temperature controller. A graphical user interface allows an operator to enter the unique identification number or data to verify the temperature measuring device and display an error message if the number or data entered is not equivalent, or does not match, the unique identification number or data stored on the electronic circuit.

14 Claims, 4 Drawing Sheets

(56) References Cited

U.S. PATENT DOCUMENTS

| | | | |
|---|---|---|---|
| 3,588,192 A | 6/1971 | Drutchas et al. | |
| 3,647,716 A * | 3/1972 | Koches | 502/41 |
| 3,867,205 A | 2/1975 | Schley | |
| 3,913,058 A | 10/1975 | Nishio et al. | |
| 4,093,491 A | 6/1978 | Whelpton et al. | |
| 4,217,463 A | 8/1980 | Swearingen | |
| 4,234,449 A | 11/1980 | Wolson et al. | |
| 4,355,912 A | 10/1982 | Haak | |
| 4,377,347 A | 3/1983 | Hanmyo et al. | |
| 4,444,990 A | 4/1984 | Villar | |
| 4,454,370 A | 6/1984 | Voznick | |
| 4,527,005 A | 7/1985 | Mckelvey | |
| 4,590,326 A * | 5/1986 | Woldy | G01K 7/02 |
| | | | 136/231 |
| 4,592,307 A | 6/1986 | Jolly | |
| 4,692,556 A | 9/1987 | Bollen et al. | |
| 4,721,533 A | 1/1988 | Phillippi et al. | |
| 4,721,534 A | 1/1988 | Phillippi et al. | |
| 4,749,416 A | 6/1988 | Greenspan | |
| 4,830,515 A | 5/1989 | Cortes | |
| 4,934,831 A | 6/1990 | Volbrecht | |
| 4,976,996 A | 12/1990 | Monkowski et al. | |
| 4,978,567 A | 12/1990 | Miller | |
| 4,984,904 A | 1/1991 | Nakano et al. | |
| 4,989,992 A | 2/1991 | Piai | |
| 5,027,746 A | 7/1991 | Frijlink | |
| 5,061,083 A | 10/1991 | Grimm et al. | |
| 5,065,698 A | 11/1991 | Koike | |
| 5,071,258 A | 12/1991 | Usher et al. | |
| 5,104,514 A | 4/1992 | Quartarone | |
| 5,108,192 A | 4/1992 | Mailliet et al. | |
| 5,158,128 A | 10/1992 | Inoue et al. | |
| 5,176,451 A | 1/1993 | Sasada et al. | |
| 5,181,779 A | 1/1993 | Shia | |
| 5,193,912 A | 3/1993 | Saunders | |
| 5,228,114 A * | 7/1993 | Suzuki | H01L 21/67248 |
| | | | 118/712 |
| 5,246,500 A | 9/1993 | Samata et al. | |
| 5,271,967 A | 12/1993 | Kramer et al. | |
| 5,294,778 A | 3/1994 | Carman et al. | |
| 5,315,092 A | 5/1994 | Takahashi et al. | |
| 5,336,327 A | 8/1994 | Lee | |
| 5,360,269 A | 11/1994 | Ogawa et al. | |
| 5,374,315 A | 12/1994 | Deboer et al. | |
| 5,421,893 A | 6/1995 | Perlov | |
| 5,456,761 A | 10/1995 | Auger et al. | |
| 5,474,618 A | 12/1995 | Allaire | |
| 5,493,987 A | 2/1996 | McDiarmid et al. | |
| 5,514,439 A | 5/1996 | Sibley | |
| 5,527,111 A | 6/1996 | Lysen et al. | |
| 5,562,774 A | 10/1996 | Breidenbach et al. | |
| 5,571,333 A | 11/1996 | Kanaya | |
| 5,611,265 A | 3/1997 | Ronci et al. | |
| 5,663,899 A * | 9/1997 | Zvonar et al. | 702/130 |
| 5,697,706 A | 12/1997 | Ciaravino et al. | |
| 5,716,133 A | 2/1998 | Hosokawa et al. | |
| 5,753,835 A | 5/1998 | Gustin | |
| 5,788,799 A | 8/1998 | Steger et al. | |
| 5,791,782 A | 8/1998 | Wooten et al. | |
| 5,806,980 A | 9/1998 | Berrian | |
| 5,857,777 A * | 1/1999 | Schuh | 374/172 |
| 5,863,123 A | 1/1999 | Lee | |
| 5,902,407 A | 5/1999 | deBoer et al. | |
| 5,904,778 A | 5/1999 | Lu et al. | |
| 5,910,221 A | 6/1999 | Wu | |
| 5,914,472 A | 6/1999 | Foladare et al. | |
| 5,953,710 A | 9/1999 | Fleming | |
| 6,045,260 A * | 4/2000 | Schwartz et al. | 374/183 |
| 6,054,678 A | 4/2000 | Miyazaki | |
| 6,056,823 A | 5/2000 | Sajoto et al. | |
| 6,066,209 A | 5/2000 | Sajoto et al. | |
| 6,091,062 A | 7/2000 | Pfahnl et al. | |
| 6,102,565 A | 8/2000 | Kita et al. | |
| 6,104,011 A | 8/2000 | Juliano | |
| 6,120,640 A | 9/2000 | Shih et al. | |
| 6,121,061 A | 9/2000 | Bilsen et al. | |
| 6,129,808 A | 10/2000 | Wicker et al. | |
| 6,170,429 B1 | 1/2001 | Schoepp et al. | |
| 6,193,414 B1 | 2/2001 | Balzano | |
| 6,227,140 B1 | 5/2001 | Kennedy et al. | |
| 6,235,858 B1 | 5/2001 | Swarup et al. | |
| 6,243,654 B1 * | 6/2001 | Johnson et al. | 702/85 |
| 6,257,758 B1 | 7/2001 | Culbertson | |
| 6,293,700 B1 * | 9/2001 | Lund et al. | 374/181 |
| 6,311,016 B1 * | 10/2001 | Yanagawa | G01K 1/20 |
| | | | 118/724 |
| 6,325,858 B1 | 12/2001 | Wengert et al. | |
| 6,342,691 B1 | 1/2002 | Johnsgard et al. | |
| 6,422,462 B1 | 7/2002 | Cohen | |
| 6,438,502 B1 * | 8/2002 | Awtrey | G01K 7/13 |
| | | | 374/163 |
| 6,441,350 B1 * | 8/2002 | Stoddard et al. | 219/497 |
| 6,536,950 B1 * | 3/2003 | Green | G01K 1/10 |
| | | | 374/141 |
| 6,580,050 B1 * | 6/2003 | Miller et al. | 219/85.16 |
| 6,676,290 B1 | 1/2004 | Lu | |
| 6,889,211 B1 * | 5/2005 | Yoshiura et al. | 705/58 |
| 7,008,802 B2 | 3/2006 | Lu | |
| 7,090,394 B2 * | 8/2006 | Hashikura | G01K 1/08 |
| | | | 374/141 |
| 7,166,165 B2 | 1/2007 | Halpin | |
| 7,168,852 B2 * | 1/2007 | Linnarsson | 374/139 |
| 7,223,014 B2 * | 5/2007 | Lojen | 374/120 |
| 7,274,867 B2 | 9/2007 | Peukert | |
| 7,320,544 B2 | 1/2008 | Hsieh | |
| 7,410,290 B2 | 8/2008 | Tanaka | |
| 7,561,982 B2 * | 7/2009 | Rund et al. | 702/130 |
| 7,621,672 B2 | 11/2009 | Ripley | |
| 7,651,269 B2 | 1/2010 | Comendant | |
| 7,661,299 B2 * | 2/2010 | Kusunoki | 73/146 |
| 7,753,584 B2 * | 7/2010 | Gambino et al. | 374/179 |
| 7,789,559 B2 | 9/2010 | Waser et al. | |
| 7,806,587 B2 | 10/2010 | Kobayashi | |
| 7,835,960 B2 | 11/2010 | Breck et al. | |
| 7,871,198 B2 | 1/2011 | Rempe et al. | |
| 7,874,726 B2 | 1/2011 | Jacobs et al. | |
| 7,946,762 B2 | 5/2011 | Yednak, III | |
| 7,957,708 B2 * | 6/2011 | Karschnia et al. | 455/127.1 |
| 7,997,795 B2 * | 8/2011 | Schwagerman et al. | 374/179 |
| 8,046,193 B2 * | 10/2011 | Yetter et al. | 702/183 |
| 8,078,310 B2 * | 12/2011 | Nishimoto et al. | 700/206 |
| 8,100,583 B2 | 1/2012 | Conner et al. | |
| 8,262,287 B2 | 9/2012 | Darabnia et al. | |
| 8,382,370 B2 | 2/2013 | Aggarwal et al. | |
| 8,496,377 B2 | 7/2013 | Harr et al. | |
| 8,506,162 B2 * | 8/2013 | Schick et al. | 374/141 |
| 8,616,765 B2 | 12/2013 | Darabnia et al. | |
| 2001/0040511 A1 * | 11/2001 | Bushner et al. | 340/825.27 |
| 2002/0009119 A1 * | 1/2002 | Matthew et al. | 374/45 |
| 2002/0011211 A1 | 1/2002 | Halpin | |
| 2002/0014483 A1 * | 2/2002 | Suzuki et al. | 219/486 |
| 2002/0043337 A1 | 4/2002 | Goodman et al. | |
| 2003/0002562 A1 * | 1/2003 | Yerlikaya et al. | 374/208 |
| 2003/0029303 A1 * | 2/2003 | Hasegawa et al. | 84/609 |
| 2003/0035905 A1 | 2/2003 | Lieberman et al. | |
| 2003/0192435 A1 | 10/2003 | McNair | |
| 2003/0231698 A1 * | 12/2003 | Yamaguchi | G01K 1/20 |
| | | | 118/179 |
| 2004/0107125 A1 | 6/2004 | Guheen et al. | |
| 2005/0042778 A1 | 2/2005 | Peukert et al. | |
| 2005/0092733 A1 | 5/2005 | Ito et al. | |
| 2005/0101843 A1 | 5/2005 | Quinn et al. | |
| 2005/0119942 A1 | 6/2005 | Horrocks et al. | |
| 2005/0141591 A1 | 6/2005 | Sakano | |
| 2006/0026314 A1 * | 2/2006 | Franchuk et al. | 710/58 |
| 2006/0275933 A1 | 12/2006 | Du Bois et al. | |
| 2007/0040020 A1 | 2/2007 | Anderson et al. | |
| 2007/0062439 A1 | 3/2007 | Wada et al. | |
| 2007/0119377 A1 | 5/2007 | Halpin | |
| 2007/0129621 A1 * | 6/2007 | Kellogg et al. | 600/365 |
| 2007/0258506 A1 | 11/2007 | Schwagerman et al. | |
| 2008/0043803 A1 | 2/2008 | Bandoh | |
| 2008/0205483 A1 | 8/2008 | Rempe et al. | |
| 2008/0228306 A1 * | 9/2008 | Yetter et al. | 700/109 |

(56) References Cited

U.S. PATENT DOCUMENTS

| | | | |
|---|---|---|---|
| 2008/0289574 A1 | 11/2008 | Jacobs et al. | |
| 2008/0291964 A1* | 11/2008 | Shrimpling et al. | 374/1 |
| 2009/0034582 A1 | 2/2009 | Carcasi | |
| 2009/0052498 A1 | 2/2009 | Halpin et al. | |
| 2009/0124131 A1* | 5/2009 | Breunsbach et al. | 439/652 |
| 2009/0159000 A1 | 6/2009 | Aggarwal et al. | |
| 2009/0204403 A1* | 8/2009 | Hollander et al. | 704/260 |
| 2009/0308425 A1 | 12/2009 | Yednak, III | |
| 2010/0144968 A1* | 6/2010 | Lee et al. | 525/52 |
| 2010/0145547 A1 | 6/2010 | Darabnia et al. | |
| 2010/0246630 A1* | 9/2010 | Kaszynski et al. | 374/1 |
| 2010/0282163 A1 | 11/2010 | Aggarwal et al. | |
| 2010/0284438 A1 | 11/2010 | Aggarwal et al. | |
| 2010/0286842 A1 | 11/2010 | Aggarwal et al. | |
| 2012/0231771 A1* | 9/2012 | Marcus | 455/414.1 |
| 2012/0310440 A1 | 12/2012 | Darabnia et al. | |
| 2015/0110147 A1* | 4/2015 | Mizuno | 374/1 |

FOREIGN PATENT DOCUMENTS

| | | |
|---|---|---|
| CN | 102439402 | 5/2012 |
| CN | 102439712 | 5/2012 |
| EP | 0229488 | 7/1987 |
| EP | 0723141 | 7/1996 |
| EP | 0887632 | 12/1998 |
| EP | 2156155 | 2/2010 |
| EP | 2185745 | 5/2010 |
| EP | 2304402 | 4/2011 |
| EP | 2370996 | 10/2011 |
| FR | 1408266 | 8/1965 |
| GB | 0752277 | 7/1956 |
| JP | 5819462 | 4/1982 |
| JP | 7-209093 | 8/1985 |
| JP | 02185038 | 7/1990 |
| JP | 05-023079 | 3/1993 |
| JP | 5-64627 | 3/1993 |
| JP | 05118928 | 5/1993 |
| JP | 09089676 | 4/1997 |
| JP | 10-153494 | 6/1998 |
| JP | 10-227703 | 8/1998 |
| JP | 11-118615 | 4/1999 |
| JP | 11-183264 | 7/1999 |
| JP | 11-183265 | 7/1999 |
| JP | 11-287715 | 10/1999 |
| JP | 11281497 | 10/1999 |
| JP | 2003035574 | 2/2003 |
| JP | 2004113270 | 4/2004 |
| JP | 2005-172489 | 6/2005 |
| JP | 2006-090762 | 4/2006 |
| JP | 2006-153706 | 6/2006 |
| JP | 2010537202 | 12/2010 |
| JP | 2012526282 | 10/2012 |
| KR | 10-2000-0031098 | 6/2000 |
| KR | 10-2002-0086763 | 11/2002 |
| KR | 10-2003-0092305 | 12/2003 |
| TW | 321717 | 12/1997 |
| TW | 200636827 | 10/2006 |
| TW | 200730803 | 8/2007 |
| WO | 9531582 | 11/1995 |
| WO | 9706288 | 2/1997 |
| WO | 9923276 | 5/1999 |
| WO | 9923690 | 5/1999 |
| WO | 0111223 | 2/2001 |
| WO | 2008147731 | 12/2008 |
| WO | 2009029532 | 3/2009 |
| WO | 2009154896 | 12/2009 |
| WO | 2010077533 | 7/2010 |
| WO | 2010129428 | 11/2010 |
| WO | 2010129430 | 11/2010 |
| WO | 2010129431 | 11/2010 |

OTHER PUBLICATIONS

Final Office Action for U.S. Appl. No. 12/140,809 dated Dec. 28, 2010.
Notice of Allowance dated Mar. 6, 2012 for U.S. Appl. No. 12/330,096.
Official Action for Japanese Patent Application 2010-522075 dated Dec. 20, 2011.
Final Office Action dated Jan. 13, 2012 for U.S. Appl. No. 12/330,096.
Final Office Action dated Jan. 23, 2012 for U.S. Appl. No. 12/436,300.
Non-Final Office Action dated Mar. 15, 2011 for U.S. Appl. No. 12/193,924.
Notice of Allowance dated Mar. 17, 2011 for U.S. Appl. No. 12/140,809.
International Preliminary Report on Patentability dated Jun. 23, 2011 in Application No. PCT/US2009/066377.
Non-Final Office Action dated Jul. 28, 2011 for U.S. Appl. No. 12/330,096.
Non-Final Office Action dated Aug. 3, 2011 for U.S. Appl. No. 12/436,300.
Non-Final Office Action dated Aug. 3, 2011 for U.S. Appl. No. 12/436,315.
Examination Report Dated May 26, 2011 for App. No. 09733043.5-2313.
CN; Office Action dated Jul. 14, 2010 in Application No. 200880012927.X.
PCT; International Search Report and Written Opinion dated Jul. 29, 2010 in Application No. PCT/US2010/033248.
USPTO; Office Action dated Sep. 13, 2010 in U.S. Appl. No. 12/140,809.
Notice of Allowance dated Jul. 26, 2010 in U.S. Appl. No. 12/121,085.
Notice of Allowance dated Oct. 4, 2010 in U.S. Appl. No. 12/121,085.
USPTO; Office Action Restriction dated Jan. 10, 2011 in U.S. Appl. No. 12/355,576.
USPTO; Office Action dated Mar. 1, 2011 in U.S. Appl. No. 12/355,576.
USPTO; Final Office Action dated Sep. 7, 2011 in U.S. Appl. No. 12/355,576.
PCT; International Preliminary Report on Patentability dated Apr. 1, 2011 in Application No. PCT/US2009/066311.
PCT; International Search Report dated Jan. 29, 2010 in Application No. PCT/US2009/066311.
PCT; Written Opinion dated Jan. 29, 2010 in Application No. PCT/US2009/066311.
Introduction to Materials Science for Engineers, 3rd Ed., James F. Schackelford, pp. 398, Macmillan Publishing Co. (1992).
Linke, J. and Vietzke, E., "Behavior of Boron Doped Graphites, Plasma Sprayed Boron Carbides and a-C/B H as Plasma Facing Material," J. Fusion Tech., V.20, pp. 228-231 (Sep. 1991).
Ponnekanti et al., "Failure Mechanisms of Anodized Aluminum Parts Used in Chemical Vapor Deposition Chambers," J. Vac. Sci. Technol. A 14(3) (May 1, 1996).
"Thermocouples for Silicon Process Technologies," Vulcan Electric Company brochure.
"Thermocouples for the Semiconductor Industry," Engelhard Corporation brochure (2004).
PCT Notification of Transmittal of the International Search Report and the Written Opinion of the International Searching Authority, or the Declaration, dated Aug. 21, 2008, for International App. No. PCT/US2008/063919.
PCT Notification of Transmittal of the International Search Report and the Written Opinion of the International Searching Authority, or the Declaration, dated Mar. 5, 2009 for International App. No. PCT/US2008/074063.
PCT Notification of Transmittal of the International Search Report and the Written Opinion of the International Searching Authority, or the Declaration, dated Nov. 27, 2009, for International App. No. PCT/US2009/043454.
Non-Final Office Action for U.S. Appl. No. 12/121,085 dated Apr. 28, 2010.
International Search Report and Written Opinion for International Application No. PCT/US2010/033244 dated Jun. 29, 2010.
International Search Report and Written Opinion for International Application No. PCT/US2009/066377 dated Jul. 1, 2010.

(56) References Cited

OTHER PUBLICATIONS

Non-Final Office Action dated Mar. 20, 2012 for U.S. Appl. No. 12/330,096.
Official Action for Japanese Patent Application 2010-522075 mailed on Apr. 13, 2012.
Non-Final Office Action dated May 22, 2012 in U.S. Appl. No. 12/436,300.
Advisory Action dated Mar. 6, 2012 for U.S. Appl. No. 12/436,300.
International Preliminary Report on Patentability for International Application No. PCT/US2008/074063 dated Feb. 24, 2010.
International Preliminary Report on Patentability for International Application No. PCT/US2010/033244 dated Nov. 9, 2011.
Office Action dated Jun. 4, 2012 in Japanese Application No. 2011-514650.
Notice of Allowance dated Jun. 7, 2012 in U.S. Appl. No. 12/330,096.
Office Action dated Sep. 13, 2012 in Japanese Application No. 2011-514650.
Office Action dated Oct. 24, 2012 in U.S. Appl. No. 12/193,924.
Notice of Allowance dated Nov. 28, 2012 in U.S. Appl. No. 12/436,300.
Extended Search Report dated Nov. 9, 2012 in European Application No. 08798519.8.
Notice of Allowance dated Dec. 21, 2012 in Japanese Application No. 2011-514650.
Office Action dated Jan. 21, 2013 in Chinese Application No. 201080020268.1.
Final Office Action dated Apr. 17, 2013 in U.S. Appl. No. 12/193,924.
Office Action dated Aug. 14, 2014 in Taiwan Application No. 099114331.
Office Action dated Apr. 3, 2014 in Chinese Application No. 201080020268.1.
Office Action dated Dec. 10, 2013 in Chinese Application No. 201080020267.7.
Office Action dated Dec. 20, 2013 in Taiwan Application No. 98117513.
Office Action dated Aug. 30, 2013 in Taiwanese Application No. 97132391.
Office Action dated Sep. 16, 2013 in U.S. Appl. No. 13/760,160.
Office Action dated Sep. 26, 2013 in Chinese Application No. 201080020268.1.
Notice of Allowance dated Sep. 27, 2013 in U.S. Appl. No. 13/563,274.
Office Action dated Dec. 27, 2013 in U.S. Appl. No. 13/760,160.
Summary of Office Action received Apr. 25, 2013 in Japanese Application No. 2012-509857.
Office Action dated May 28, 2013 in U.S. Appl. No. 13/563,274.
Advisory Action dated Jul. 9, 2013 in U.S. Appl. No. 12/193,924.
Final Office Action dated Sep. 25, 2014 in U.S. Appl. No. 13/760,160.
Non-Final Office Action dated Jan. 28, 2015 in U.S. Appl. No. 13/760,136.
Office Action dated Sep. 23, 2014 in Chinese Application No. 201080020268.1.
Office Action dated Aug. 1, 2014 in Taiwan Application No. 099114329.
Office Action dated Dec. 30, 2014 in Taiwan Application No. 099114330.

\* cited by examiner

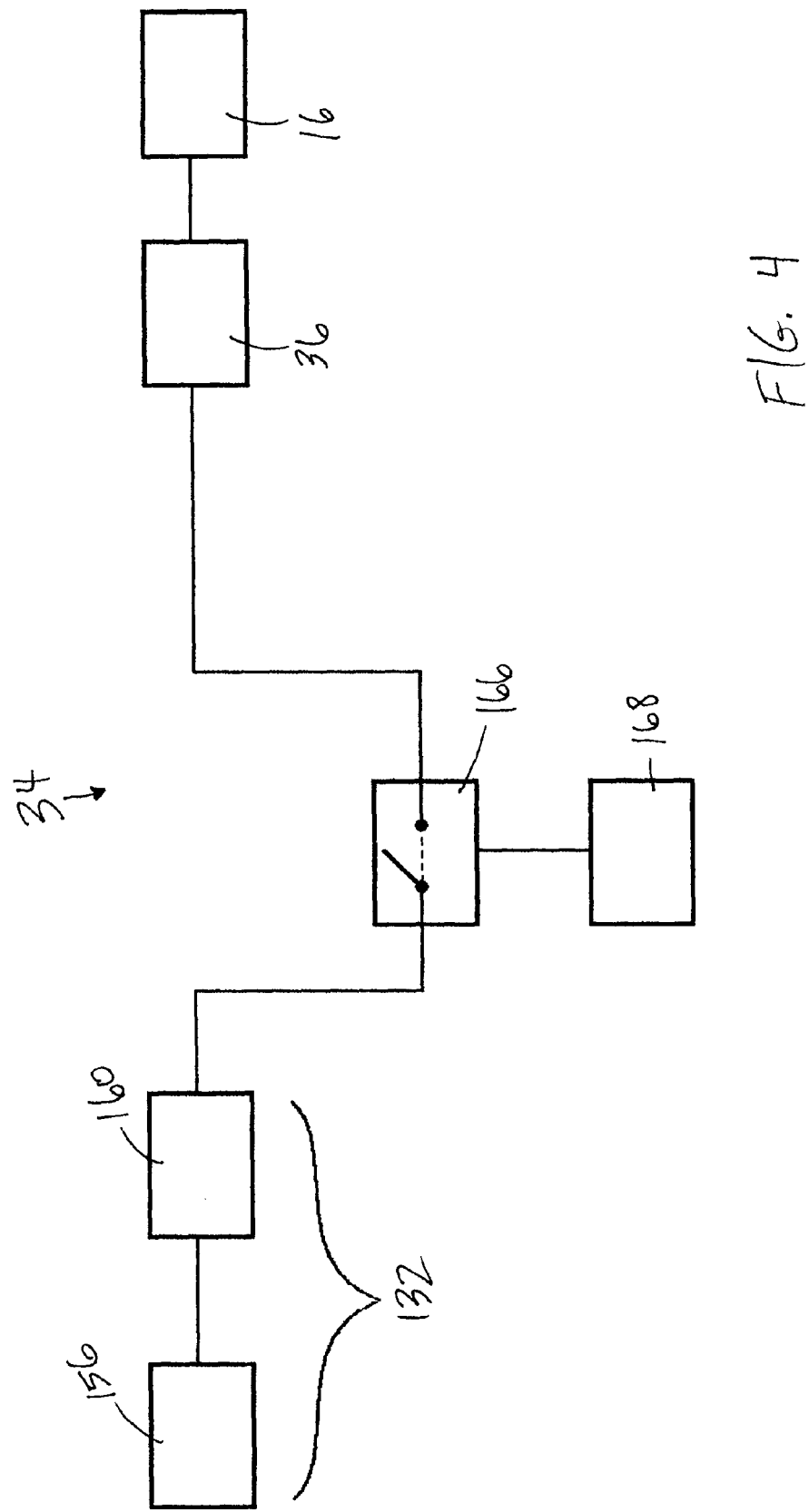

SMART TEMPERATURE MEASURING DEVICE

FIELD OF THE INVENTION

The present invention relates to a temperature measuring device, and more particularly to a temperature measuring device configured to enhance accuracy of temperature control in a semiconductor processing apparatus.

BACKGROUND OF THE INVENTION

Temperature controlled semiconductor processing chambers are used for depositing various material layers onto a substrate surface or surfaces. In processing substrates within the processing chamber, one or more substrates or workpieces, such as silicon wafers, are placed on a workpiece support within the processing chamber. Both the substrate and workpiece support are heated to a desired temperature. In a typical processing step, reactant gases are introduced into the processing chamber and passed over each heated substrate, whereby a chemical vapor deposition (CVD) or an atomic layer deposition (ALD) process deposits a thin layer of the reactant material in the reactant gases on the substrate surface(s). Through subsequent processes, these layers are formed into integrated circuits, and tens to thousands or even millions of integrated devices, depending on the size of the substrate and the complexity of the circuits, are cut from the processed substrate.

Various process parameters must be carefully controlled to ensure the high quality of the resulting deposited layers. One such critical parameter is the temperature of the substrate during each processing step. During CVD, for example, the deposition gases react at particular temperatures to deposit the thin layer on the substrate. If the temperature varies greatly across the surface of the substrate, the deposited layer could be uneven. Accordingly, it is important that the substrate temperature be stable and uniform at the desired temperature during processing of the substrate. Similarly, non-uniformity or instability of temperatures across a substrate during other thermal treatments can affect the uniformity of resulting structures on the surface of the substrate. Other processes for which temperature control can be critical include, but are not limited to, oxidation, nitridation, dopant diffusion, sputter depositions, photolithography, dry etching, plasma processes, and high temperature anneals.

Methods and systems are known for measuring the temperature at various locations near and immediately adjacent to the substrate being processed. Typically, thermocouple assemblies are disposed at various locations near the substrate being processed, and these thermocouple assemblies are operatively connected to a controller to assist in providing a more uniform temperature across the entire surface of the substrate. For example, U.S. Pat. No. 6,121,061 issued to Van Bilsen generally teaches a plurality of temperature sensors measuring the temperature at various points surrounding the substrate, including a thermocouple assembly placed near the leading edge of the substrate, another near the trailing edge, one at a side, and another below the substrate near the center of the substrate.

A problem often associated with the replacement of thermocouple assemblies, either because of failure or for regular maintenance, is the variability between each thermocouple assembly. The variability between each thermocouple assembly may be due to any number of factors including, but not limited to, materials used or the methods for producing the thermocouple assemblies. The variability of each thermocouple assembly may result in varying temperature measurements, or a different temperature measurement at the same temperature relative to a previous thermocouple assembly, which in turn may affect the deposition process if the measured temperature is substantially different than the actual temperature within the reaction chamber. Because the temperature control system is based on the calibrated temperature measured by each thermocouple assembly connected to the system, any variability of the calibration between successive thermocouple assemblies will cause variations in the temperature control scheme that may lead to non-uniform deposition of layers on the substrates.

A need therefore exists for a temperature measuring device that includes pre-calibrated parameters such that the deposition tool can be automatically adjusted to account for the pre-calibrated parameters of the temperature measuring device. A need also exists for a temperature measuring device in which pre-calibrated parameters are integrally included with the temperature measuring device.

BRIEF SUMMARY OF THE INVENTION

In one aspect of the present invention, a thermocouple assembly is provided. The thermocouple assembly includes at least one thermocouple junction for measuring temperature. The thermocouple assembly also includes an electronic circuit on which calibration data and a unique identification number is stored. The thermocouple junction is operatively connected to the electronic circuit.

In another aspect of the present invention, a temperature control system is provided. The temperature control system includes at least one heating element and a temperature controller. Each heating element(s) is operatively connected to the temperature controller, and the temperature controller controls output of the heating element(s). The temperature control system further includes a temperature measuring device operatively connected to the temperature controller. The temperature measuring device includes an electronic circuit integrated therein.

In yet another aspect of the present invention, a method for verifying a temperature measuring device for a semiconductor processing tool is provided. The method includes providing a temperature measuring device having an electronic circuit integrated therein, wherein the electronic circuit includes at least a unique identification number or data saved thereon. The method also includes providing module controller operatively connected to the temperature measuring device. The method further includes providing a temperature controller operatively connected to the module controller and the temperature measuring device. The method also includes verifying the unique identification number or data saved on said temperature measuring device prior to a transfer of data between the temperature measuring device and the temperature controller or module controller.

In a further aspect of the present invention, a method for verifying a temperature measuring device for a semiconductor processing tool is provided. The method includes providing a module controller operatively connected to a temperature controller. The method further includes connecting a temperature measuring device to the module controller, wherein the module controller queries the temperature measuring device for a unique identification number stored on an electronic circuit integrated with the temperature measuring device. The method also includes entering an identification number into a graphical user interface (GUI). The GUI is operatively connected to the module controller. The method also includes comparing the unique identification number stored on the electronic circuit of the temperature measuring device with the identification number entered into the GUI. The method includes allowing data transfer between the temperature measuring device and the temperature controller if the unique identification number stored on the electronic circuit of the temperature measuring device is equivalent to the identification number entered into the GUI. The method further includes preventing data transfer between the temperature measuring device and the temperature controller if the unique identification number stored on the electronic circuit of the temperature measuring device is not equivalent to the identification number entered into the GUI.

Advantages of the present invention will become more apparent to those skilled in the art from the following description of the embodiments of the invention which have been shown and described by way of illustration. As will be realized, the invention is capable of other and different embodiments, and its details are capable of modification in various respects. Accordingly, the drawing(s) and description are to be regarded as illustrative in nature and not as restrictive.

BRIEF DESCRIPTION OF SEVERAL VIEWS OF THE DRAWINGS

FIG. 4 illustrates an electrical schematic diagram of a temperature control system.

DETAILED DESCRIPTION OF THE PREFERRED EMBODIMENT

Figure 1:
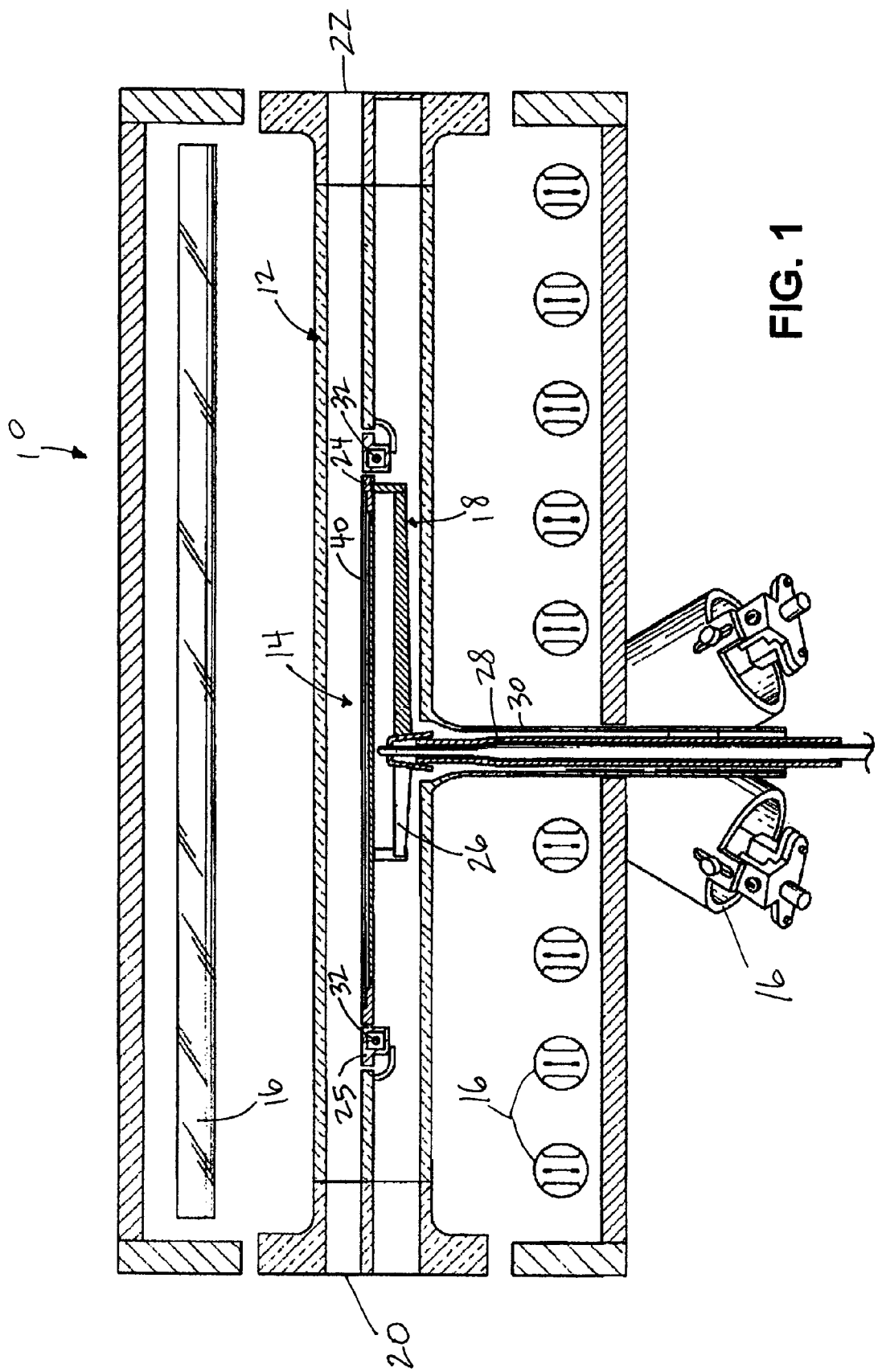
FIG. 1 is a side cross-sectional view of an embodiment of a reactor of a semiconductor processing tool.

Referring to FIG. 1, an exemplary embodiment of a chemical vapor deposition ("CVD") reactor 10 is shown. While the illustrated embodiment is a single substrate, horizontal flow, cold-wall reactor, it should be understood by one skilled in the art that the thermocouple technology described herein may be used in other types of semiconductor processing reactors as well as other applications requiring accurate temperature sensors. The reactor 10 includes a reaction chamber 12 defining a reaction space 14, heating elements 16 located on opposing sides of the reaction chamber 12, and a substrate support mechanism 18. The reaction chamber 12 is an elongated member having an inlet 20 for allowing reactant gases to be introduced into the reaction space 14 and an outlet 22 through which the reactant gases and process by-products exit the reaction space 14. In an embodiment, the reaction chamber 12 is formed of transparent quartz that is configured to allow substantially all of the radiant energy from the heating elements 16 to pass through the walls of the reaction chamber 12. The heating elements 16 provide radiant energy to the reaction chamber 12 without appreciable absorption by the reaction chamber 12 walls. The heating elements 16 are configured to provide radiant heat of wavelengths absorbed by the substrate being processed as well as portions of the substrate support mechanism 18.

In an embodiment, the substrate support mechanism 18 includes a substrate holder 24 upon which a substrate 40 is disposed during a deposition process, as illustrated in FIG. 1. The substrate support mechanism 18 also includes a support member 26 configured to support the substrate holder 24. The support member 26 is connected to a shaft 28 that extends downwardly through a tube 30 extending from the lower wall of the reaction chamber 12. A motor (not shown) is configured to rotate the shaft 28, thereby rotating the substrate holder 24 and substrate 40 in a like manner during the deposition process. A susceptor ring 25 is disposed about the edge of the substrate 40 and substrate holder 24 to counteract the heat loss from the edges therefrom. Temperature measuring devices 32, such as thermocouple assemblies, pyrometers, or the like, are disposed within the susceptor ring 25 to measure the localized temperature at pre-determine positions about the substrate 40 and substrate holder 24.

Figure 2:
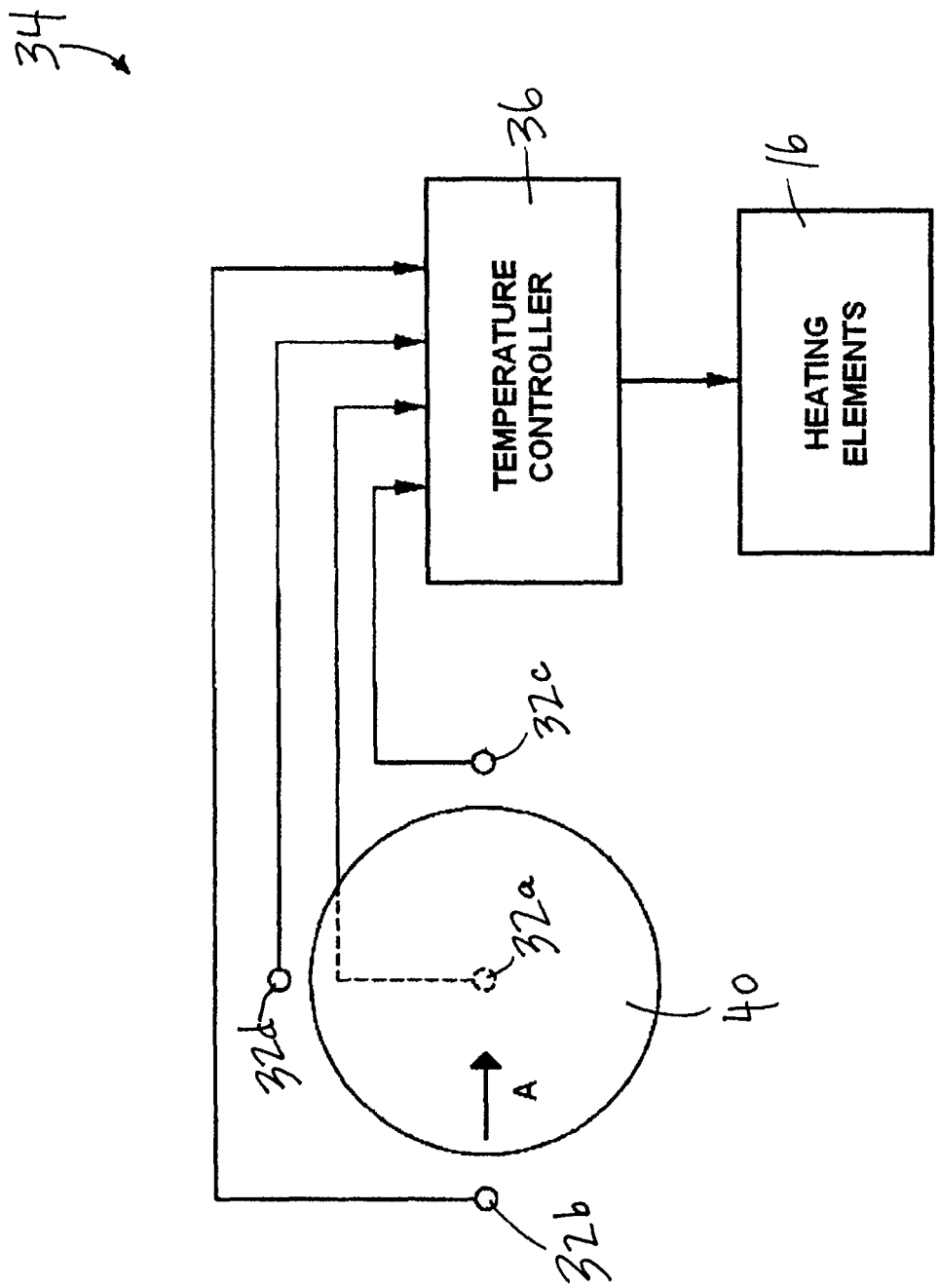
FIG. 2 is a schematic diagram of an exemplary temperature control system.

Referring to FIG. 2, an embodiment of a temperature control system 34 within a reaction chamber is illustrated. The illustrated temperature controlling system 34 for a chemical vapor deposition reactor 10 includes a plurality of temperature measuring devices 32 that are located adjacent to the substrate 40 and the substrate holder 24 for measuring temperatures at pre-determined locations. The temperature measuring devices 32 are operatively connected to a temperature controller 36. The temperature controller 36 is operatively connected to the heating elements 16 to control the heating scheme within the reaction chamber 12.

In the schematic diagram of FIG. 2, the illustrated embodiment of the a temperature control system 34 includes a plurality of temperature measuring devices 32 disposed about the substrate 40, wherein the temperature measuring devices 32 include: a central temperature sensor 32a located adjacent to the lower surface of the substrate holder 24, a leading edge temperature sensor 32b, a trailing edge temperature sensor 32c, and at least one side edge temperature sensor 32d. The leading and trailing edge temperature sensors 32b, 32c are located adjacent to the front and rear edges of the substrate 40 relative to the direction of flow A of the reactant gases within the reaction space 14. The temperature measuring devices 32 are configured to measure the temperature in the localized area and transmit temperature measurement data to the temperature controller 36. The temperature controller 36 is configured to selectively adjust the energy emitted from the heating element(s) 16 in response to data provided by the temperature measuring devices 32 to maintain a substantially uniform temperature distribution across the entire substrate 40 being processed. It should be understood by one skilled in the art that the temperature control system 34 may include any number of temperature measuring devices 32 disposed at different locations within, or external to, the reaction chamber 12 for providing data to the temperature controller 36 of the temperature of the substrate 40 being processed or locations adjacent to the substrate 40.

The temperature measuring devices 32 may include thermocouple assemblies, pyrometers, thermometers, or any other temperature measuring device capable of measuring temperatures within semiconductor manufacturing equipment. In an embodiment, each of the temperature measuring devices 32 is the same as the others. In another embodiment, at least one temperature measuring device 32 is different than the others. In an embodiment, each of the temperature measuring devices 32 is a thermocouple assembly such as the thermocouple assembly described in U.S. patent application Ser. No. 12/140,809. Although the illustrated temperature control system 34 includes four temperature measuring devices 32, it should be understood by one skilled in the art that the temperature control system 34 may include any number and type of temperature measuring devices 32.

Figure 3:
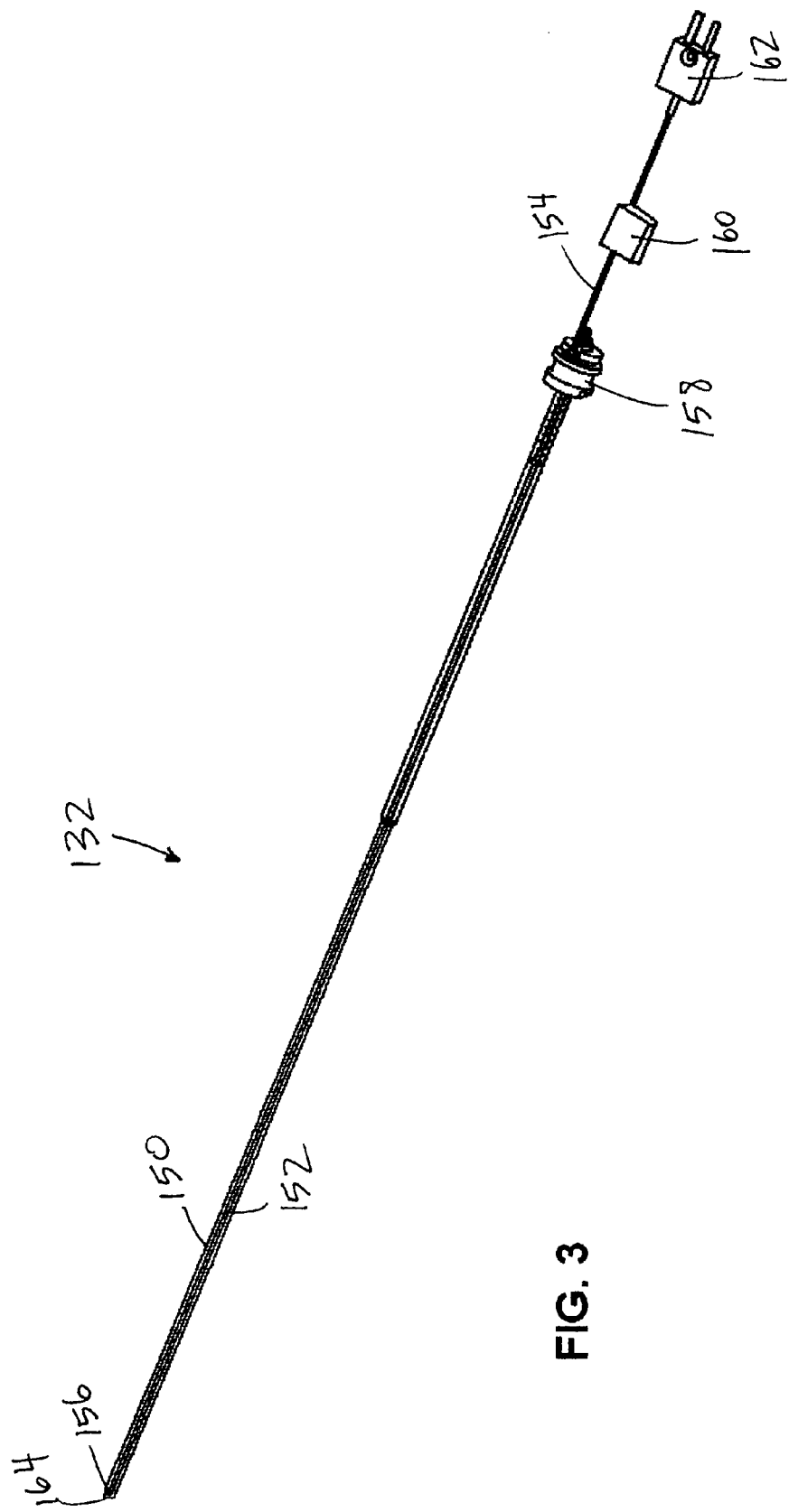
FIG. 3 is an isometric view of an exemplary temperature measuring device.

Referring to FIG. 3, an exemplary embodiment of a smart thermocouple assembly 132 is shown. While the preferred embodiments of a temperature measuring device of the present invention are discussed in the context of a thermocouple assembly, one skilled in the art will appreciate that the principles and advantages taught herein will have application to other temperature measuring devices that can be used for measuring temperatures within semiconductor processing reactors or semiconductor manufacturing equipment. In an embodiment, the thermocouple assembly 132 includes a sheath 150, a support member 152, a pair of wires 154, a junction 156, a cap 158, an electronic circuit 160, and a plug 162. The sheath 150 is an elongated, tubular member having a measuring tip 164 that forms a closed end. The opposing end of the sheath 150 forms an open end to which the cap 158 is connected. In an embodiment, the sheath 150 is formed of quartz, however, it should be understood by one skilled in the art that the sheath 150 can be formed of any material sufficient to withstand the temperature variations as well as be substantially inert with respect to the gases introduced into the reaction chamber.

In the embodiment illustrated in FIG. 3, the support member 152 is disposed within the sheath 150 and extends at least a portion of the length of the sheath 150. The support member 152 is configured to receive the pair of wires 154 therein. In an embodiment, the support member 152 is formed of a ceramic material. In an embodiment, the pair of wires 154 extend from the end of the support member 152 adjacent the measuring tip 164 of the sheath 150 to the electronic circuit 160. The wires 154 are formed of dissimilar metals, and an end of each wire is fused to the end of the other wire to form the junction 156 that provides a thermocouple therebetween. The illustrated embodiment shows the junction 156 being located adjacent the measuring tip 164 of the sheath 150, but it should be understood by one skilled in the art that the thermocouple assembly 132 may include a plurality of junctions located at any position(s) along the length of the sheath 150.

In an embodiment, the wires 154 operatively connect the junction 156 to the electronic circuit 160 and the plug 162, as shown in FIG. 3. The plug 162 provides an interface between the thermocouple assembly 132 and the temperature controller 36, as illustrated in FIG. 4. The plug 162 provides a physical connection between the thermocouple assembly 132 and the temperature controller 36, but it should be understood by one skilled in the art that the thermocouple assembly 132 may alternatively include a wireless transmitter (not shown) to operatively connect the thermocouple assembly 132 to the temperature controller 36 without requiring a physical connection therebetween.

As illustrated in FIGS. 3-4, the junction 156 is operatively connected to the electronic circuit 160. The illustrated embodiment shows the electronic circuit 160 positioned between the cap 158 and the plug 162, but it should be understood by one skilled in the art that the electronic circuit 160 can be located at any position between the junction and the interface to which the thermocouple assembly 132 is connected. In an embodiment, the electronic circuit 160 is integrated within the cap 158. In another embodiment, the electronic circuit 160 is integrated within the plug 162. It should be understood by one skilled in the art that the electronic circuit 160 can be located at any location on the thermocouple assembly 132 while maintaining an operative connection to the junction 156.

During assembly of the thermocouple assembly 132, the thermocouple assembly 132 is calibrated using a National Institute of Standards and Technology (NIST) traceable calibration device to verify the accuracy of the thermocouple assembly 132. Also during assembly of the thermocouple assemblies 132, each thermocouple assembly 132 is provided with a unique identification number or data, such as a serial number or the like, that is specific to that thermocouple assembly. The calibration data and the unique identification number are stored on the electronic circuit 160 and travel with and within the smart thermocouple assembly 132. It should be understood by one skilled in the art that other data or identifiers may also be stored on the electronic circuit 160 in addition to the calibration data and the unique identification number. In an embodiment, the electronic circuit 160 includes a data storage device on which the calibration data and the unique identification number of the thermocouple assembly 132 are stored. In an embodiment, the electronic circuit 160 includes an electrically erasable programmable read-only memory (EEPROM) on which the calibration data and unique identification number are stored. In another embodiment, the electronic circuit 160 includes a flash memory on which the calibration data and unique identification number are stored. It should be understood by one skilled in the art that any other data storage device on which the calibration data and the unique identification number of the thermocouple assembly are stored can be incorporated with the electronic circuit 160. It should also be understood by one skilled in the art that the calibration data and unique identification number may be stored on the same memory device or different memory devices within the electronic circuit 160.

The smart thermocouple assembly 132 is configured to improve the accuracy and performance of the temperature control system 34 by providing verification of the thermocouple assembly as well as providing pre-calibration settings to reduce or eliminate the time and effort needed to calibrate thermocouple assemblies once they are installed. The smart thermocouple assembly 132 is also configured to ensure the proper type of temperature measuring device is used with the temperature control system 34, thereby allowing proper communication therebetween the thermocouple assembly and the temperature control system 34. The smart thermocouple assembly 132 will also reduce the probability of error due to incorrect or inadequate calibration data because the thermocouple assembly is pre-calibrated using a calibration device as opposed to on-the-fly calibration after installation in the reactor 10 (FIG. 1).

FIG. 4 illustrates an exemplary schematic of a temperature control system 34 having an operative connection between the smart thermocouple assembly 132 and the temperature controller 36 of the temperature control system 34. As previously described, the thermocouple junction 156 is operatively connected to the electronic circuit 160 integrated within the thermocouple assembly 132. When the thermocouple assembly 132 is installed, the thermocouple assembly 132 is operatively connected to the temperature controller 36 by way of a module controller 166. A graphical user interface (GUI) 168 is also operatively connected to the module controller 166. The GUI 168 provides an interface between the operator and the module controller 166 whereby information can be transferred between the GUI 168 and the module controller 166. The module controller 166 is configured to verify the thermocouple assembly 132 connected to the temperature controller 36 prior to data, or a temperature measurement, being transferred from the thermocouple assembly 132 to the temperature controller 36. In other words, the module controller 166 acts as a switch between the thermocouple assembly 132 and the temperature controller 36 such that temperature measurements from the junction 156 are not transferred to the temperature controller prior to the module controller 166 verifying the thermocouple assembly 132.

In operation, an operator installing the thermocouple assembly 132 into a reactor 10 operatively connects the thermocouple assembly 132 to the module controller 166. Once the thermocouple assembly 132 is operatively connected, the module controller 166 transmits a signal to the electronic circuit 160 to query the electronic circuit 160 for the unique identification number or data stored thereon. If a thermocouple assembly 132 is installed in the reactor 10 that does not include a electronic circuit 160 integrated therein, the module controller 166 receives no return transmission or data from the thermocouple assembly and then transmits a signal to the GUI 168 to provide an error message to the operator indicating that the thermocouple assembly 132 is not compatible with the temperature control system 34. If the thermocouple assembly 132 does include a electronic circuit 160 integrated therein, the electronic circuit 160 transmits a signal to the module controller 166 that includes the unique identification number or data of the particular thermocouple assembly 132. Once the module controller 166 receives the unique identification number or data from the electronic circuit 160, the module controller 166 queries the operator to enter the same unique identification number or data that corresponds to the particular thermocouple assembly 132 for confirmation and verification of the unique identification number or data of the particular thermocouple assembly 132 via the GUI 168. Once the operator has entered an identification number or data, the identification number or data is transmitted to the module controller 166. The modular controller 166 compares the unique identification number of the thermocouple assembly 132 with the identification number or data entered by the operator. If the identification number or data is not equivalent to the unique identification number or data of the particular thermocouple assembly 132, the module controller 166 transmits a signal to the GUI 168 to instruct the GUI 168 to display an error message for the operator to indicate that the identification number or data that the operator entered did not correspond with the unique identification number or data of the particular thermocouple assembly 132. The module controller 166 also prevents the transfer of data between the thermocouple assembly 132 and the temperature controller 36 when the identification number or data input by the operator into the GUI 168 does not correspond to the unique identification number or data of the particular thermocouple assembly 132.

The process for verification of the thermocouple assembly 132 explained above can be performed at any time after the thermocouple assembly 132 is installed and operatively connected to the module controller 166. In an embodiment, the verification process is performed immediately after the thermocouple assembly 132 is operatively connected to the module controller 166. In another embodiment, the verification process is performed immediately prior to the operation of the reactor 10 such that processing of a substrate 40 within the reactor 10 will begin only after the thermocouple assembly 132 is verified. Verifying the thermocouple assembly 132 immediately prior to processing within the reactor 10 ensures that another thermocouple assembly 132 was not switched, because switching of the thermocouple assembly 132 may result in poor processing results due to different calibration data of different thermocouple assemblies. In yet another embodiment, the verification process can be performed at regular intervals during processing, for example, between processing a random pair of substrates. It should be understood by one skilled in the art that the thermocouple assembly verification process can be performed at any time to ensure the proper thermocouple assembly 132 is being used during processing to ensure optimized processing results.

If the operator enters an identification number or data into the GUI 168 that corresponds to the unique identification number or data of the particular thermocouple assembly 132, the module controller 166 compares the unique identification number of the thermocouple assembly 132 with the identification number or data entered by the operator to determine the numbers or data are equivalent and verifies the thermocouple assembly 132. Once the thermocouple assembly 132 has been verified, the module controller 166 transmits a signal to the electronic circuit 160 to query the electronic circuit 160 for the calibration data stored thereon. The electronic circuit 160 then transfers the calibration data to the temperature controller 36 either directly or via the module controller 166. The temperature controller 36 receives the calibration data and adjusts the temperature control system 34 accordingly. Once the module controller 166 has verified the thermocouple assembly 132 and the calibration data on the electronic circuit 160 is transferred to the temperature control system 34, data and information can freely be transmitted between the thermocouple assembly 132 and the temperature controller 36.

Verification of the temperature measuring device having an integrated electronic circuit 160 reduces the possibility of error in the temperature measuring device by ensuring the temperature measuring device was properly calibrated prior to installation. Verification of the temperature measuring device having an integrated electronic circuit 160 also reduces the possibility of error in the temperature measuring device by confirming that only temperature measuring devices having an electronic circuit that has calibration data of the temperature measuring device and a unique identification number or data stored thereon are being used in the semiconductor processing tool. This verification process further reduces the amount of time necessary for an operator to install or replace a temperature measuring device in the reactor by integrating the calibration data into the temperature measuring device assembly.

The smart temperature measuring device described above was directed to a thermocouple assembly as the measuring device, but it should be understood by one skilled in the art that the technology for validating and confirming the temperature measuring device can be incorporated with any other temperature measuring device, including a pyrometer, a thermometer, or the like.

While preferred embodiments of the present invention have been described, it should be understood that the present invention is not so limited and modifications may be made without departing from the present invention. The scope of the present invention is defined by the appended claims, and all devices, process, and methods that come within the meaning of the claims, either literally or by equivalence, are intended to be embraced therein.

What is claimed is:

1. A thermocouple assembly for measuring a temperature within a reaction chamber, the thermocouple assembly comprising:
   a thermocouple junction of a pair of wires for measuring temperature within the reaction chamber;
   a support member to receive the pair of wires, the support member disposed within a sheath;
   an interface plug for operatively connecting the thermocouple assembly to a temperature controller; and
   an electronic circuit on which calibration data and a unique identification number are stored, wherein said at least one thermocouple junction is operatively connected to said electronic circuit, wherein the electronic circuit is disposed between the thermocouple junction and the interface plug, wherein said electronic circuit transmits said unique identification number via said interface plug to said temperature controller in order to uniquely identify said thermocouple assembly, wherein said calibration data comprises pre-calibrated parameters integrally included in said electronic circuit wherein said pre-calibrated parameters are determined using a NIST traceable calibration device during assembly of said thermocouple, wherein said electronic circuit transfers the calibration data to the temperature controller for adjusting the temperature controller, wherein the electronic circuit is integrated with the thermocouple assembly, and wherein a module controller connected to the electronic circuit prevents data transfer between the thermocouple assembly and the temperature controller by verifying if the unique identification number stored in the electronic circuit is not equivalent to the identification number entered into a graphical user interface connected to the module controller.

2. The thermocouple assembly of claim 1, wherein said electronic circuit includes an electrically erasable programmable read-only memory (EEPROM).

3. The thermocouple assembly of claim 2, wherein said unique identification number is stored on said EEPROM.

4. The thermocouple assembly of claim 1, wherein said electronic circuit includes a flash memory.

5. The thermocouple assembly of claim 2, wherein said unique identification number is stored on said flash memory.

6. The thermocouple assembly of claim 1, further comprising a plurality of junctions operatively connected to said electronic circuit.

7. The thermocouple assembly of claim 1, further comprising a cap disposed between the thermocouple junction and the interface.

8. The thermocouple assembly of claim 7, wherein the electronic circuit is disposed between the cap and the interface.

9. The thermocouple assembly of claim 7, wherein the interface comprises a plug, and the electronic circuit is disposed between the cap and the plug.

10. The thermocouple assembly of claim 1, wherein the electronic circuit includes a memory device, and wherein the calibration data and unique identification number are stored on the memory device.

11. The thermocouple assembly of claim 1, wherein the electronic circuit is configured to transmit, via the interface, the unique identification number in response to a query received by the electronic circuit via the interface.

12. The thermocouple assembly of claim 1, wherein the electronic circuit is configured to transmit, via the interface, the calibration data in response to a query received by the electronic circuit via the interface.

13. The thermocouple assembly of claim 1, wherein the electronic circuit is configured to transmit, via the interface, data regarding a temperature measured by the thermocouple junction.

14. The thermocouple assembly of claim 1, wherein the support member is formed of ceramic material.

\* \* \* \* \*